United States Patent
Thubert et al.

(10) Patent No.: US 10,244,525 B2
(45) Date of Patent: Mar. 26, 2019

(54) PROMISCUOUS DETECTION AND INTERCEPTED FORWARDING BY PARENT NETWORK DEVICE IN A STORING-MODE TREE-BASED NETWORK

(71) Applicant: Cisco Technology, Inc., San Jose, CA (US)

(72) Inventors: Pascal Thubert, La Colle sur Loup (FR); Patrick Wetterwald, Mouans Sartoux (FR); Eric Michel Levy-Abegnoli, Valbonne (FR); Jean-Philippe Vasseur, Anchorage, AK (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 291 days.

(21) Appl. No.: 15/009,872

(22) Filed: Jan. 29, 2016

(65) Prior Publication Data
US 2017/0223700 A1    Aug. 3, 2017

(51) Int. Cl.
| H04W 72/04 | (2009.01) |
| H04L 12/44 | (2006.01) |
| H04L 12/24 | (2006.01) |
| H04L 5/00  | (2006.01) |
| H04L 12/751| (2013.01) |

(52) U.S. Cl.
CPC ....... *H04W 72/0446* (2013.01); *H04L 5/0055* (2013.01); *H04L 12/44* (2013.01); *H04L 41/12* (2013.01); *H04L 45/02* (2013.01)

(58) Field of Classification Search
CPC ..... H04W 72/0413; H04L 12/44; H04L 45/48
See application file for complete search history.

(56) References Cited

U.S. PATENT DOCUMENTS

| 7,366,111 | B2   | 4/2008  | Thubert et al. |
| 7,533,159 | B1 * | 5/2009  | Jones ............. H04L 12/1886 |
|           |      |         |                      709/220 |
| 8,111,684 | B2   | 2/2012  | Thubert et al. |
| 8,300,626 | B2   | 10/2012 | Thubert et al. |

(Continued)

OTHER PUBLICATIONS

Afanasyev et al., Efficiency through Eavesdropping: Link-layer Packet Caching, 2008, NSDI '08: 5th USENIX Symposium on Networked Systems Design and Implementation, p. 105-118. (Year: 2008).*

(Continued)

*Primary Examiner* — Hoon J Chung
(74) *Attorney, Agent, or Firm* — Leon R. Turkevich

(57) ABSTRACT

In one embodiment, a method comprises: promiscuously detecting, by a parent network device in a tree-based network topology, a data packet transmitted to a child network device attached to the parent network device, the data packet transmitted by a grandchild network device attached to the child network device; determining, by the parent network device, whether the data packet transmitted to the child network device is to be forwarded toward a destination via the parent network device; and the parent network device selectively initiating intercepted forwarding of the data packet toward the destination, on behalf of the child network device, based on determining that the data packet is to be forwarded toward the destination via the parent network device.

18 Claims, 3 Drawing Sheets

(56) References Cited

U.S. PATENT DOCUMENTS

2007/0258508 A1* 11/2007 Werb .................. H04W 84/18
375/140
2014/0372585 A1   12/2014 Hui et al.
2016/0020979 A1   1/2016 Thubert et al.

OTHER PUBLICATIONS

Hoang, Practical Opportunistic Routing in Wireless Mesh Networks, 2012, Florida State University Libraries: Electronic Theses, Treatises and Dissertations, 110 pages. (Year: 2012).*
Weng et al., "6TiSCH Operation Sublayer (6top) Interface", [online], Jul. 6, 2015, [retrieved on Jan. 27, 2016]. Retrieved from the Internet: <URL: https://tools.ietf.org/pdf/draft-ietf-6tisch-6top-interface-04.pdf>, pp. 1-34.
Thubert, Ed., "An Architecture for IPv6 over the TSCH mode of IEEE 802.15.4", [online], Nov. 26, 2015, [retrieved on Jan. 27, 2016]. Retrieved from the Internet: <URL: https://tools.ietf.org/pdf/draft-ieft-6tisch-architecture-09.pdf>, pp. 1-47.
Sudhaakar et al., "6TiSCH Resource Management and Interaction using CoAP", [online], Mar. 9, 2015, [retrieved on Jan. 27, 2016]. Retrieved from the Internet: <URL: https://tools.ietf.org/pdf/draft-ieft-6tisch-coap-03.pdf>, pp. 1-16.
Vilajosana et al., "Minimal 6TiSCH Configuration", [online], Jan. 16, 2016, [retrieved on Jan. 27, 2016]. Retrieved from the Internet: <URL: https://tools.ieft.org/pdf/draft-ieft-6tisch-minimal-14.pdf>, pp. 1-28.
Palattella, et al., "Terminology in IPv6 over the TSCH mode of ISSS 802.15.4e", [online], Nov. 2, 2015, [retrieved on Jan. 27, 2016]. Retrieved from the Internet: <URL: https://tools.ietf.org/pdf/draft-ieft-6tisch-terminology-06.pdf>, pp. 1-14.
Lampin, "Reseaux urbains de capteurs sans-fil: Applications, caracterisation et protocoles", [online], Jan. 30, 2014, [retrieved on Dec. 9, 2015]. Retrieved from the Internet: <URL: http://www.theses.fr/2014ISAL0001>, pp. 1-3.
Winter, et al., "RPL: IPv6 Routing Protocol for Low-Power and Lossy Networks", Internet Engineering Task (IETF), Request for Comments: 6550, Mar. 2012, pp. 1-157.
Watteyne, et al., "Using IEEE 802.15.4e Time-Slotted Channel Hopping (TSCH) in the Internet of Things (IoT): Problem Statement", Internet Engineering Task Force (IETF), Request for Comments: 7554, May 2015, pp. 1-23.
Thubert et al., "IETF 6TSCH: Combining IPv6 Connectivity with Industrial Performance", 2013 Seventh International Conference on Innovative Mobile and Internet Services in Ubiquitous Computing, IEEE, Jul. 3, 2013, XP032485811, pp. 541-546.
Thubert et al., U.S. Appl. No. 14/642,066, filed Mar. 9, 2015.

* cited by examiner

US 10,244,525 B2

PROMISCUOUS DETECTION AND INTERCEPTED FORWARDING BY PARENT NETWORK DEVICE IN A STORING-MODE TREE-BASED NETWORK

TECHNICAL FIELD

The present disclosure generally relates to the promiscuous detection and intercepted forwarding of a data packet by a parent network device in a storing-mode tree-based network.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

The Internet Engineering Task Force (IETF) is attempting to propose standards that can be applied to wireless devices for the stringent requirements of deterministic networks (e.g., minimal jitter, low latency, minimal packet loss). For example, Low power and Lossy Networks (LLNs) allow a large number (e.g., tens of thousands) of resource-constrained devices to be interconnected to form a wireless mesh network. The IETF has proposed a routing protocol ("6TiSCH") that provides IPv6 routing using time slotted channel hopping (TSCH) based on IEEE 802.15.4e, enabling LLN devices to use low-power operation and channel hopping for higher reliability. Routes can be based on the routing protocol for LLNs (RPL).

The 6TiSCH architecture specifies a Channel distribution/usage (CDU) matrix of "cells", each cell representing a unique wireless channel at a unique timeslot. The CDU is partitioned into prescribed "chunks", each chunk comprising multiple cells distributed in time and frequency (i.e., a different channel each timeslot). The 6TiSCH architecture specifies that a RPL parent device can allocate cells within an appropriated chunk to its first-hop child devices within its interference domain.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
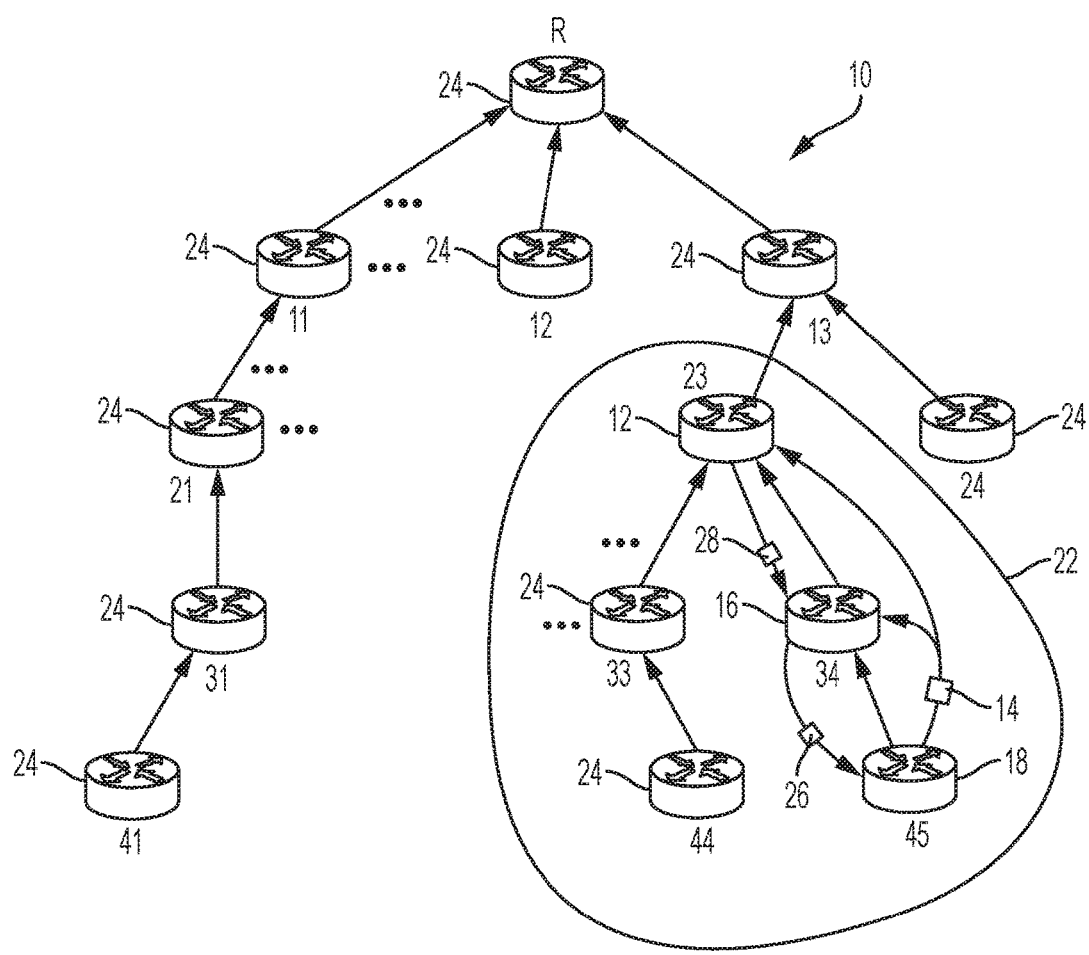
FIG. 1 illustrates a tree-based network comprising an example apparatus, implemented as a parent network device in the tree-based network, executing promiscuous detection and intercepted forwarding of a data packet having been transmitted to a child network device, according to an example embodiment.

In one embodiment, a method comprises: promiscuously detecting, by a parent network device in a tree-based network topology, a data packet transmitted to a child network device attached to the parent network device, the data packet transmitted by a grandchild network device attached to the child network device; determining, by the parent network device, whether the data packet transmitted to the child network device is to be forwarded toward a destination via the parent network device; and the parent network device selectively initiating intercepted forwarding of the data packet toward the destination, on behalf of the child network device, based on determining that the data packet is to be forwarded toward the destination via the parent network device.

In another embodiment, an apparatus comprises a device interface circuit and a processor circuit. The device interface circuit is configured for promiscuously detecting a data packet transmitted to a child network device attached to the apparatus, the apparatus operating as a parent network device in a tree-based network topology, the data packet transmitted by a grandchild network device attached to the child network device. The processor circuit is configured for determining whether the data packet transmitted to the child network device is to be forwarded toward a destination via the parent network device. The processor circuit further is configured for selectively initiating intercepted forwarding of the data packet toward the destination, on behalf of the child network device, based on determining that the data packet is to be forwarded toward the destination via the parent network device.

In another embodiment, one or more non-transitory tangible media are encoded with logic for execution by a machine and when executed by the machine operable for: promiscuously detecting, by the machine operating as a parent network device in a tree-based network topology, a data packet transmitted to a child network device attached to the parent network device, the data packet transmitted by a grandchild network device attached to the child network device; determining, by the parent network device, whether the data packet transmitted to the child network device is to be forwarded toward a destination via the parent network device; and the parent network device selectively initiating intercepted forwarding of the data packet toward the destination, on behalf of the child network device, based on determining that the data packet is to be forwarded toward the destination via the parent network device.

DETAILED DESCRIPTION

Particular embodiments enable a parent network device in a tree-based topology (implemented in a storing mode) to promiscuously detect a data packet transmitted to a child device, and execute intercepted forwarding of the data packet on behalf of the child network device toward a destination, in order to opportunistically save the child network device from the necessity of transmitting the data packet to the parent network device. The parent network device that is in a hop-by-hop path between the child network device (having received the data packet from a "grandchild" network device attached to the child network device) and the destination can send an acknowledgement indicating reception of the data packet to the child network device, enabling the child network device to reduce power consumption by halting any forwarding of the data packet toward the parent network device.

As used herein, the term "intercepted forwarding" refers to the parent network device "intercepting" possession of the data packet from a child network device based on the promiscuous detection of the data packet, and the parent network device sending (to the child network device) the acknowledgement indicating reception of the data packet, enabling the child network device to "release" possession of the data packet and halt forwarding of the data packet. Hence, the "intercepted forwarding" is based on the promiscuous detection, "intercepting" (e.g., acquiring) possession of the data packet (instead of the child network device during the next-hop transmission from the grandchild network device), and forwarding the data packet along the intended path toward the destination without the necessity of the hop-by-hop transmission from the child network device to the parent network device.

Hence, the example embodiments can reduce power consumption requirements and therefore extend battery life of resource-constrained LLN devices, based on a parent network device executing intercepted forwarding of a data packet having been transmitted to a resource-constrained child LLN device, including notifying the resource-constrained child LLN device that the parent network device has already received the data packet. Consequently, the example embodiments enable a data packet to traverse a reduced path to a destination, as opposed to a hop-by-hop path in a tree-based network topology, based on a parent network device promiscuously detecting and executing intercepted forwarding of a data packet on behalf of a child network device; the reduced path to a destination can be further reduced if multiple parent devices along a path in the tree-based network topology can successively promiscuously detect and execute intercepted forwarding of the data packet on behalf of their child network device.

FIG. 1 illustrates an example tree-based network topology 10 in a data network comprising an apparatus 12 configured for promiscuous detection and intercepted forwarding of a data packet 14 on behalf a child network device 16, according to an example embodiment. The data packet 14 can be transmitted by a "grandchild" network device 18 that is a "child" of the child network device 16. As described in further detail below, the data packet 14 that is transmitted by the grandchild network device 18 to the child network device 16 can be promiscuously detected by the apparatus 12, also referred to herein as a "parent network device". The parent network device 12 can promiscuously detect the data packet 14 transmitted by the grandchild network device 18 based on the parent network device 12 monitoring a timeslot (20 of FIG. 2) having been allocated to the grandchild network device 18 from a chunk within an interference domain 22 of a CDU matrix.

The network 10 can be a stand-alone deterministic network, or can be part of a larger deterministic data network having multiple network devices (e.g., constrained LLN devices, also referred to as "Internet of Things" (IoT) network devices) 12, 16, 18, and/or 24 arranged in a tree-based topology 10. The tree-based network topology 10 can be implemented as a RPL based network according to the Internet Engineering Task Force (IETF) Request for Comments (RFC) 6550, where the network devices 12, 16, 18, and/or 24 can build a destination oriented directed acyclic graph (DODAG) from multiple network devices having one or more paths to a destination. As described below, each of the network devices 12, 16, 18, and/or 24 can organize themselves into a DODAG over a channel distribution/usage (CDU) matrix according to 6TiSCH. Hence, the network 10 of FIG. 1 can illustrate a subsection of a directed acyclic graph (DAG), also known as a "sub-DAG", where the root network device "R" 24 can be a child network device of another parent network device in another sub-DAG, and each child network device can be a corresponding parent network device of a corresponding sub-DAG.

Each network device in the tree-based network topology 10 is illustrated as having a reference character designation and a topology designation: the topology designation (e.g., "R" for the root of the tree-based network topology 10, "11" for a first-hop child network device of the root "R", etc.) is used to uniquely identify a network device in the tree-based network topology 10, and the reference character designation is used to identify a network device by its positional relationship to other network devices in describing the example embodiments. The root network device "R" 24 can establish the tree-based network topology, according to the RPL protocol described in RFC 6550, based on outputting one or more DODAG information object (DIO) messages; the network devices "11", "12", and "13" 24 can respond to the DIO message by attaching as children to the root network device "R" 24, and sending up to the root network device "R" 24 destination advertisement object (DAO) messages advertising reachability to specified destinations. Each of the network devices "11", "12", and "13" 24 can output its own updated DIO message; as illustrated in FIG. 1, the network device "21" 24 can attach to its parent network device "11" 24 in response to a DIO message from the network device "11" 24, and the parent network device "23" 12 can attach to its parent network device "13" in response to the DIO message from the network device "13" 24.

In response to the parent network device "23" 12 outputting an updated DIO message, the child network device "33" 24 and the child network device "34" 16 can attach to their parent network device "23" 12; in response to attachment the child network devices "33" 24 and "34" 16 can output to the parent network device "23" 12 their respective DAO messages advertising reachability to specified destinations. Similar attachment procedures (and outputting of DAO messages) can be executed by the grandchild network device "45" 18 attaching to the child network device "34" 16, as well as the attachment by the other network devices "24", "31", "41", and "44" 24. Other network devices (not shown) may be attached within the tree-based network topology 10. RFC 6550 describes a storing mode topology, where each parent network device can store the reachability information specified in each DAO message as the DAO message is propagated toward the root network device "R" 24.

The parent network device "23" 12, as part of organizing a DODAG over a CDU matrix, can appropriate (i.e., acquire or claim) an unused one of the channel distribution chunks from the CDU matrix relative to neighboring network devices within an interference domain 22 for communication with its child network devices "33" 24 and "34" 16 within the interference domain 22. The parent network device "23" 12 also can allocate an unused chunk to each of the child network devices "33" 24 and "34" 16 within the interference domain 22; as illustrated below, the parent network device "23" 12 can allocate a chunk "C1" to the child network device "34" 16, the parent network device "23" 12 allocate a chunk "C2" to the child network device "33" 24, and the parent network device "23" 12 can claim a chunk "C3" for its own communication with the child network devices "33" 24 and "34" 16.

Figure 2:
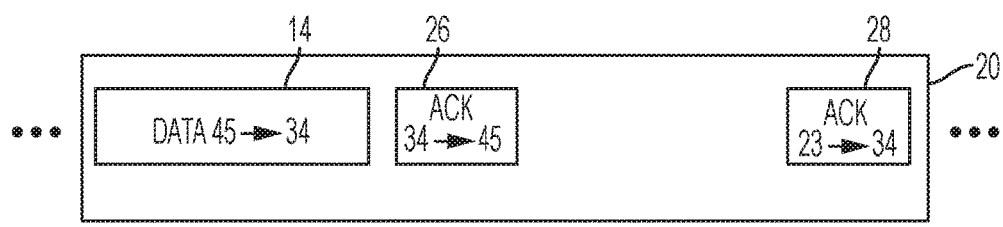
FIG. 2 illustrates an example transmission timeslot including a promiscuous acknowledgement by the apparatus of FIG. 1 in response to the promiscuous detection of the data packet, according to an example embodiment.

Hence, the child network device "34" 16 can allocate a cell from the allocated chunk "C1" for use by the grandchild network device "45" 18 in transmitting a data packet 14 to the child network device "34" 16 during the timeslot 20 of FIG. 2 at the frequency offset specified by the allocated cell. Conventional implementations of 6TiSCH in a RPL network involve the child network device "34" 16 transmitting an acknowledgment "34→35" 26 (illustrated in FIG. 2) in response to reception of the data packet 14 from the grandchild network device "45" 18, and the child network device "34" 16 forwarding the data packet 14 to the parent network device "23" 12 if the destination for the data packet 14 is not reachable via a child of the child network device "34" 16. Hence, conventional implementations of 6TiSCH and RFC 6550 assume a hop-by-hop propagation of the data packet 14 from its source (the grandchild network device "45" 18) to its destination: if the data packet 14 was destined for the root network device "R" 24, the data packet 14 normally would be required to traverse the hop-by-hop path "34-23-13-R"; if the data packet 14 was destined for the network device "44" 24, the data packet 14 normally would be required to traverse the hop-by-hop path "34-23-33-44".

According to example embodiments, the parent network device "23" 12 can promiscuously detect the data packet 14 during transmission in the timeslot 20 allocated to the grandchild network device "45" 18, based on the cell for timeslot 20 (for the specified channel offset) being a member of the chunk "C1" and the parent network device "23" 12 being aware of the chunk "C1" allocated by the parent network device "23" 12 to the child network device "34" 16. The parent network device "23" 12 can determine from its internal routing information base (RIB) (46 of FIG. 3) whether the data packet 14 is to be forwarded toward a destination via the parent network device "23" 12; in other words, the parent network device "23" 12 can determine whether the child network device "34" 16 normally would be required to forward the data packet 14 upwards to the parent network device "23" 12. In response to the parent network device "23" 12 determining that the data packet 14 is to be forwarded toward the destination via the parent network device "23" 12, the parent network device "23" 12 can select to initiate intercepted forwarding of data packet 14, on behalf of the child network device "34" 16; the parent network device "23" 12 also can send to the child network device "34" 16 a parent acknowledgement "23→34" 28 during the timeslot 20.

Hence, the child network device "34" 16, in response to receiving the parent acknowledgement "23→34" 28, can halt (i.e., suppress) any forwarding of the data packet 14 toward the parent network device "23" 12, based on the parent acknowledgement "23→34" 28 that indicates the parent network device "23" 12 has already received the data packet 14, enabling the child network device "34" 16 to reduce power consumption (and extend battery life). The parent network device "23" 12 can execute intercepted forwarding of the data packet 14 to the appropriate next-hop network device toward the destination (e.g., its parent network device "13" 24 or its second child network device "33" 24) using the appropriate chunk (e.g., "C2" for transmission to the second child network device "33" 24).

Figure 3:
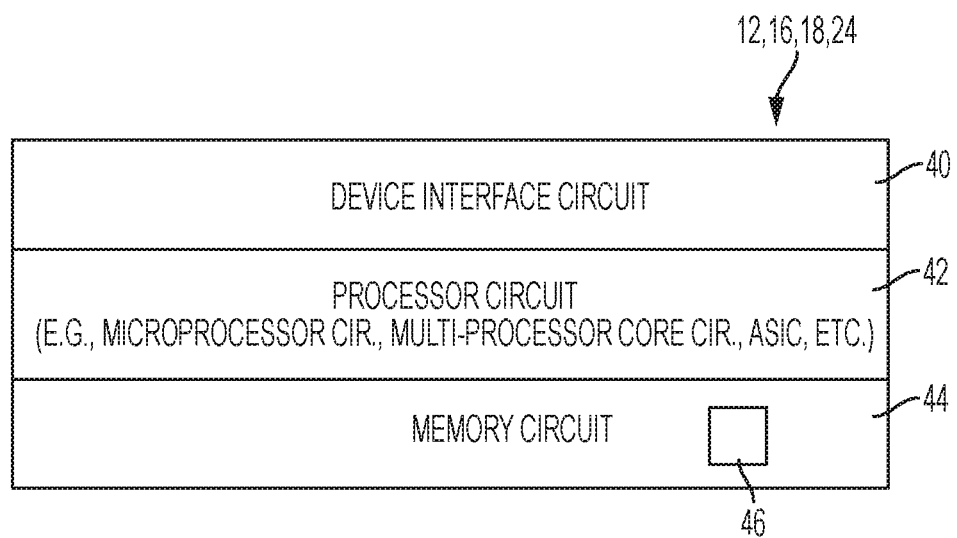
FIG. 3 illustrates an example implementation of any one of the network devices of FIG. 1, according to an example embodiment.

FIG. 3 illustrates an example implementation of any one of the devices 12, 16, 18, and/or 24 of FIG. 1, according to an example embodiment. The apparatus 12, 16, 18, and/or 24 is a physical machine (i.e., a hardware device) configured for implementing network communications with other physical machines via the network 10. The term "configured for" or "configured to" as used herein with respect to a specified operation refers to a device and/or machine that is physically constructed and arranged to perform the specified operation. Hence, the apparatus 12, 16, 18, and/or 24 is a network-enabled machine implementing network communications via the network 10. The apparatus 12, 16, 18, and/or 24 can be implemented as an LLN device that executes RPL according to RFC 6550.

Each apparatus 12, 16, 18, and/or 24 can include a device interface circuit 40, a processor circuit 42, and a memory circuit 44. The device interface circuit 40 can include one or more distinct physical layer transceivers for communication with any one of the other devices 12, 16, 18, and/or 24; the device interface circuit 40 also can include an IEEE based Ethernet transceiver for communications with the devices of FIG. 1 via any of the links (shown in FIG. 1 as arrows from a child network device to a parent network device) (e.g., a wired or wireless link, an optical link, etc.). The processor circuit 42 can be configured for executing any of the operations described herein, and the memory circuit 44 can be configured for storing any data or data packets as described herein.

Any of the disclosed circuits of the devices 12, 16, 18, and/or 24 (including the device interface circuit 40, the processor circuit 42, the memory circuit 44, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 44) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 44 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 44 can be implemented dynamically by the processor circuit 42, for example based on memory address assignment and partitioning executed by the processor circuit 42.

Figure 4:
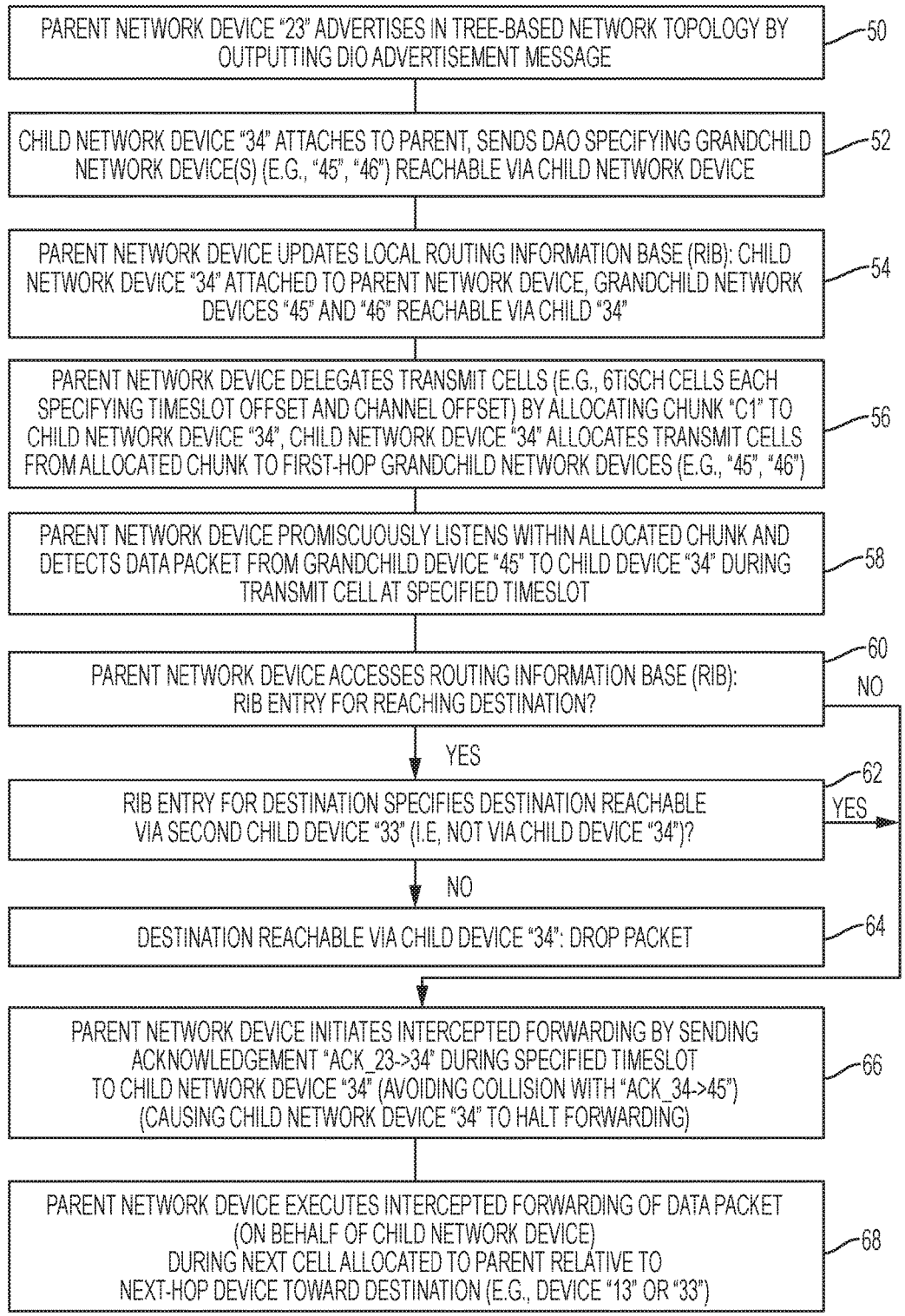
FIG. 4 illustrates an example method of the apparatus of FIG. 1, as a parent network device executing promiscuous detection and intercepted forwarding of a data packet, according to an example embodiment.

FIG. 4 illustrates an example method of the apparatus 12 of FIG. 1, as a parent network device executing promiscuous detection and intercepted forwarding of a data packet 14, according to an example embodiment. The operations described with respect to any of the Figures can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or at least some of the operations in parallel.

Referring to operation 50 of FIG. 4, the processor circuit 42 of the parent network device "23" 12 is configured for advertising its membership in the tree-based network topology 10 (rooted at the root network device "R" 24) based on generating and outputting (via the device interface circuit 40 of the parent network device "23" 12) a DIO advertisement message. As described previously, each of the network devices 12, 16, 18, and/or 24 can attach within the tree-based network topology 10 according to RFC 6550 and send and/or receive data packets 14 according to 6TiSCH, although other techniques for formation of the tree-based network topology 10 or transmission of data packets according to a time-slotted scheme can be used.

The child network device "34" 16 (and the second child network device "33" 24) in operation 52 can respond to detection of the DIO advertisement message by attaching to the parent network device "23" 12, and sending to the parent network device "23" 12 a DAO message specifying any "grandchild" network devices that are reachable via the child network device "34" 16. A grandchild network device such as the grandchild network device "45" 18 or another grandchild network device "46" (not shown in FIG. 1) can attach to the child network device "34" 16 either before or after attachment by the child network device "34" 16 to the parent network device "23" 12, since the child network device "34" 16 can send updated DAO messages in response to another grandchild network device attaching to the child network device "34" 16.

The processor circuit 42 of the parent network device "23" 12, in response to receiving the DAO message (detected by the device interface circuit 40 of the parent network device "23" 12) transmitted by the child network device "34" 16, is configured for updating in operation 54 its local routing information base 46 in the memory circuit 44 with one or more RIB entries specifying reachability information for one or more destinations specified in the DAO message; for example, the processor circuit 42 of the parent network device "23" 12 can update the routing information base 46, based on the DAO message from the child network device "34" 16, to specify that the grandchild network device "45" 18 is reachable via the child network device "34" 16; the processor circuit 42 also can update the routing information base 46 if another grandchild network device "46" is identified as reachable via the child network device "34" 16, either in the same DAO message or a different DAO message.

The processor circuit 42 of the parent network device "23" 12 in operation 56 can delegate one or more 6TiSCH transmit cells in operation 56 based on allocating a chunk "C1" containing the 6TiSCH transmit cells to the child network device "34" 16; the child network device "34" 16 can allocate individual transmit cells from the allocated chunk "C1" to its first-hop grandchildren network devices "45" 18 and "46" (not shown in FIG. 1). Hence, the device interface circuit 40 (and/or the processor circuit 42 controlling the device interface circuit 40) of the parent network device "23" 12 in operation 58 can promiscuously listen within the allocated chunk "C1": the promiscuous listening within the allocated chunk "C1" by the device interface circuit 40 enables the promiscuous detection by the parent network device "23" 12 of the data packet 14 transmitted by the grandchild network device "45" 18 at the specified timeslot 20 (using the specified frequency channel offset) of the allocated transmit cell.

The processor circuit 42 of the parent network device "23" 12, in response to promiscuously detecting the data packet 14 during the timeslot 20, in operation 60 can access its routing information base 46 to determine whether the data packet 14 (transmitted to the child network device "34" 16) is to be forwarded toward a destination via the parent network device "23" 12; in other words, the processor circuit 42 of the parent network device "23" 12 in operations 60 and 62 determines whether the child network device "34" 16 normally is required to forward the data packet 14 to the parent network device "23" 12. For example, if the processor circuit 42 of the parent network device "23" 12 determines that there is no entry in the routing information base 46 for reaching the destination, then the processor circuit 42 has not received any DAO specifying reachability to the destination, such that none of the child network devices "33", "34", or "44" have specified reachability to the destination identified in the data packet 14; hence, the default operation for an unknown destination is to forward the data packet 14 "up" toward the next parent device, where the child network device "34" 16 would forward the data packet 14 to the parent network device "23" 12, and the parent network device "23" 12 would forward the data packet 14 to its parent network device "13" 24.

Hence, the processor circuit 42 of the parent network device "23" 12 can selectively initiate intercepted forwarding of the data packet 14 in operation 66 in response to a determined absence in operation 60 of any reachability information for the destination of the data packet 14 in the routing information base 46. The initiation of intercepted forwarding in operation 66 is described in further detail below.

If in operation 60 the processor circuit 42 of the parent network device "23" 12 detects an entry in the routing information base 46 (i.e., a "RIB entry") for reaching the destination specified in the data packet 14, the processor circuit 42 of the parent network device "23" 12 in operation 62 can determine whether the RIB entry specifies the destination is reachable via a second child network device (e.g., the child network device "33" 24); in other words, the processor circuit 42 of the parent network device "23" 12 in operation 60 determines whether the destination is reachable via a different child device and not via the child network device "34" 16. In particular, if the parent network device "23" 12 determines from the RIB entry that the destination is reachable via the child network device "34" 16, then the processor circuit 42 of the parent network device "23" 12 determines in operation 64 that the child network device "34" 16 has a downward path to reach the destination of the data packet 14 (e.g., via another child "46" attached to the child network device "34" 16) and therefore the child network device "34" 16 is not required to forward the data packet 14 to the parent network device "23" 12; hence, the processor circuit 42 of the parent network device "23" 12 in operation 64 can drop the data packet 14 because the child network device "34" 16 has a downward path to reach the destination and would not forward the data packet 14 to the parent network device "23" 12.

If, however, the processor circuit 42 of the parent network device "23" 12 determines that the child network device "34" 16 normally would be required to forward the data packet 14 to the parent network device "23" 12 to reach the destination via the parent network device "23" 12 (either via the parent network device "13" 24 as determined in operation 60 or via a second child device "33" as determined in operation 62), the processor circuit 42 of the parent network device "23" 12 initiates intercepted forwarding in operation 66.

In particular, the processor circuit 42 of the parent network device "23" 12 in operation 66 initiates intercepted forwarding by sending the parent acknowledgement "23→34" 28 to the child network device "34" 16 within the same transmit cell (e.g., during the same timeslot 20) used by the grandchild network device "45" 18 to transmit the data packet 14. The device interface circuit 40 of the parent network device "23" 12 can be configured for using carrier sense multiple access with collision avoidance (CSMA-CA) to ensure the parent acknowledgement "23→34" 28 does not collide or interfere with the acknowledgment "34→35" 26 transmitted by the child network device "34" 16 to the grandchild network device "45" 18. Hence, the parent acknowledgement "23→34" 28 indicates to the child network device "34" 16 the reception of the data packet 14 by the parent network device "23" 12, which can cause the child network device "34" 16 to halt any transmission of the data packet 14 toward the parent network device "23" 12. Consequently, battery power in the child network device "34" 16 can be extended due to the reduced power consumption in removing the necessity of the child network device "34" 16 transmitting the data packet 14 to the parent network device "23" 12.

The processor circuit 42 of the parent network device "23" 12 in operation 68 can cause the device interface circuit 40 to execute intercepted forwarding of the data packet 14, on behalf of the child network device "34" 16, to the appropriate next-hop network device (e.g., the child network device "33" 24 for a destination reachable via the child network device "33" 24, or the parent network device "13" 24 for a destination reachable via the parent network device "13" 24) using the appropriate transmit cell.

According to example embodiments, a parent network device can selectively execute intercepted forwarding of a data packet, on behalf of a child network device, eliminating the need for the child network device to forward the data packet to the parent network device. The example embodiments enable reduced power consumption by minimizing unnecessary transmissions in the tree-based network. The example embodiments also increase the probability of successful reception of the data packet 14 by the parent network device "23" 12 (e.g., in noisy wireless environments) especially where in cases where there is poor reception quality between the parent network device "23" 12 and the child network device "34" 16, since the parent network device "23" 12 is able to receive data packet 14 during the timeslot 20 used by the timeslot 20.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
   promiscuously detecting, by a parent network device in a tree-based network topology, a data packet transmitted to a child network device attached to the parent network device, the data packet transmitted during a first of a plurality of prescribed timeslots by a grandchild network device attached to the child network device and having been allocated the first timeslot for transmission by the grandchild network device to the child network device;
   determining, by the parent network device, whether the data packet transmitted to the child network device is to be forwarded toward a destination via the parent network device; and
   the parent network device selectively initiating intercepted forwarding of the data packet toward the destination, on behalf of the child network device, based on determining that the data packet is to be forwarded toward the destination via the parent network device, including responding to the data packet by sending, within the first timeslot allocated to the grandchild network device, a promiscuous acknowledgment to the child network device, the promiscuous acknowledgment indicating reception of the data packet and causing the child network device to halt any transmission associated with forwarding of the data packet.

2. The method of claim 1, wherein the promiscuously detecting is based on the parent network device monitoring the first timeslot, having been delegated by the parent network device, for transmission of the data packet by the grandchild network device to the child network device.

3. The method of claim 2, further comprising the parent network device allocating a chunk comprising a plurality of said timeslots delegated by the parent network device, enabling the child network device to allocate the corresponding first timeslot to the grandchild network device.

4. The method of claim 1, wherein the determining is based on identifying, from a routing information base in the parent network device, whether:

the destination is reachable via the child network device; or the child network device is required to forward the data packet to the parent network device.

5. The method of claim 4, wherein the identifying that the child network device is required to forward the data packet to the parent network device is based on one of:
- an absence in the routing information base of any reachability information for the destination; or
- an entry in the routing information base specifying the destination is reachable via a second child attached to the parent network device.

6. The method of claim 4, further comprising:
- the parent network device receiving, from the child network device, an advertisement specifying the destination is reachable via the child network device; and
- the parent network device updating the routing information base, in response to the advertisement, specifying the destination is reachable via the child network device;
- the parent network device dropping the data packet in response to determining the destination is reachable via the child network device.

7. An apparatus comprising:
- a device interface circuit configured for promiscuously detecting a data packet transmitted to a child network device attached to the apparatus, the apparatus operating as a parent network device in a tree-based network topology, the data packet transmitted during a first of a plurality of prescribed timeslots by a grandchild network device attached to the child network device and having been allocated the first timeslot for transmission by the grandchild network device to the child network device; and
- a processor circuit configured for determining whether the data packet transmitted to the child network device is to be forwarded toward a destination via the parent network device, the processor circuit further configured for selectively initiating intercepted forwarding of the data packet toward the destination, on behalf of the child network device, based on determining that the data packet is to be forwarded toward the destination via the parent network device, the processor circuit further configured for selectively initiating intercepted forwarding based on responding to the data packet by sending, within the first timeslot allocated to the grandchild network device, a promiscuous acknowledgment to the child network device, the promiscuous acknowledgment indicating reception of the data packet and causing the child network device to halt any transmission associated with forwarding of the data packet.

8. The apparatus of claim 7, wherein the promiscuously detecting is based on the device interface circuit monitoring the first timeslot, having been delegated by the processor circuit, for transmission of the data packet by the grandchild network device to the child network device.

9. The apparatus of claim 8, wherein the processor circuit is configured for allocating a chunk comprising a plurality of said timeslots delegated by the parent network device, enabling the child network device to allocate the corresponding first timeslot to the grandchild network device.

10. The apparatus of claim 7, further comprising a memory circuit configured for storing a routing information base, the processor circuit configured for identifying, from the routing information base, whether:
- the destination is reachable via the child network device; or
- the child network device is required to forward the data packet to the parent network device.

11. The apparatus of claim 10, wherein the processor circuit is configured for identifying that the child network device is required to forward the data packet to the parent network device is based on one of:
- an absence in the routing information base of any reachability information for the destination; or
- an entry in the routing information base specifying the destination is reachable via a second child attached to the parent network device.

12. The apparatus of claim 10, wherein:
- the device interface circuit is configured for receiving, from the child network device, an advertisement specifying the destination is reachable via the child network device;
- the processor circuit is configured for updating the routing information base, in response to the advertisement, specifying the destination is reachable via the child network device;
- the processor circuit is configured for dropping the data packet in response to determining the destination is reachable via the child network device.

13. One or more non-transitory tangible media encoded with logic for execution by a machine and when executed by the machine operable for:
- promiscuously detecting, by the machine operating as a parent network device in a tree-based network topology, a data packet transmitted to a child network device attached to the parent network device, the data packet transmitted during a first of a plurality of prescribed timeslots by a grandchild network device attached to the child network device and having been allocated the first timeslot for transmission by the grandchild network device to the child network device;
- determining, by the parent network device, whether the data packet transmitted to the child network device is to be forwarded toward a destination via the parent network device; and
- the parent network device selectively initiating intercepted forwarding of the data packet toward the destination by the parent network device, on behalf of the child network device, based on determining that the data packet is to be forwarded toward the destination via the parent network device, including responding to the data packet by sending, within the first timeslot allocated to the grandchild network device, a promiscuous acknowledgment to the child network device, the promiscuous acknowledgment indicating reception of the data packet and causing the child network device to halt any transmission associated with forwarding of the data packet.

14. The one or more non-transitory tangible media of claim 13, wherein the promiscuously detecting is based on the parent network device monitoring the first timeslot, having been delegated by the parent network device, for transmission of the data packet by the grandchild network device to the child network device.

15. The one or more non-transitory tangible media of claim 14, further operable for allocating a chunk comprising a plurality of said timeslots delegated by the parent network device, enabling the child network device to allocate the corresponding first timeslot to the grandchild network device.

16. The one or more non-transitory tangible media of claim 13, wherein the determining is based on identifying, from a routing information base in the parent network device, whether:
- the destination is reachable via the child network device; or
- the child network device is required to forward the data packet to the parent network device.

17. The one or more non-transitory tangible media of claim 16, wherein the identifying that the child network device is required to forward the data packet to the parent network device is based on one of:
- an absence in the routing information base of any reachability information for the destination; or
- an entry in the routing information base specifying the destination is reachable via a second child attached to the parent network device.

18. The one or more non-transitory tangible media of claim 16, further operable for:
- the parent network device receiving, from the child network device, an advertisement specifying the destination is reachable via the child network device; and
- the parent network device updating the routing information base, in response to the advertisement, specifying the destination is reachable via the child network device;
- the parent network device dropping the data packet in response to determining the destination is reachable via the child network device.

\* \* \* \* \*